(12) United States Patent
Ruud et al.

(10) Patent No.: US 11,250,611 B1
(45) Date of Patent: Feb. 15, 2022

(54) GRAPHICS PROCESSING

(71) Applicant: Arm Limited, Cambridge (GB)

(72) Inventors: Ole Magnus Ruud, Oslo (NO); Rafal Stepuch, Cambridge (GB); Toni Viki Brkic, Staffanstorp (SE)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/163,281

(22) Filed: Jan. 29, 2021

(51) Int. Cl.
*G06T 15/00* (2011.01)
*G06T 15/80* (2011.01)

(52) U.S. Cl.
CPC ............ *G06T 15/005* (2013.01); *G06T 15/80* (2013.01)

(58) Field of Classification Search
None
See application file for complete search history.

(56) References Cited

U.S. PATENT DOCUMENTS

| | | | | |
|---|---|---|---|---|
| 2015/0178983 A1* | 6/2015 | Akenine-Moller | ..... | G06T 15/80 345/426 |
| 2017/0263046 A1* | 9/2017 | Patney | ..... | G06F 3/013 |
| 2017/0293995 A1* | 10/2017 | Saleh | ..... | G06T 15/005 |
| 2017/0323475 A1* | 11/2017 | Moreton | ..... | G06T 15/30 |
| 2018/0047203 A1* | 2/2018 | Grossman | ..... | G06T 15/005 |
| 2018/0232936 A1* | 8/2018 | Nevraev | ..... | G06T 11/40 |
| 2018/0240268 A1* | 8/2018 | Nevraev | ..... | G06T 15/005 |
| 2018/0284872 A1* | 10/2018 | Schluessler | ..... | G06F 9/5083 |
| 2019/0005712 A1* | 1/2019 | Nevraev | ..... | G06T 11/40 |
| 2019/0005713 A1* | 1/2019 | Nevraev | ..... | G06T 17/10 |
| 2019/0005714 A1* | 1/2019 | Fuller | ..... | G06T 1/20 |
| 2020/0051290 A1* | 2/2020 | Yang | ..... | G06T 13/20 |

OTHER PUBLICATIONS

DirectX Developer Blog, "Variable Rate Shading: a scalpel in a world of sledgehammers", Mar. 18, 2019, Microsoft, website, retrieved from: https://devblogs.microsoft.com/directx/variable-rate-shading-a-scalpel-in-a-world-of-sledgehammers/ on Dec. 3, 2021.*

* cited by examiner

*Primary Examiner* — Robert Bader
(74) *Attorney, Agent, or Firm* — Vierra Magen Marcus LLP

(57) ABSTRACT

A method of operating a graphics processor that executes a graphics processing pipeline that can generate a render output using different shading rates is disclosed. First and second input shading rates are combined prior to rasterisation, and a combined shading rate may be propagated through the pipeline instead of the first and second input shading rates. The combined shading rate may then be combined with a third input shading rate at or after the rasterisation stage. This can reduce bandwidth, hardware and energy requirements.

19 Claims, 5 Drawing Sheets

GRAPHICS PROCESSING

BACKGROUND

The technology described herein relates to the processing of computer graphics, and in particular to a method of operating a graphics processor.

Graphics processing is normally carried out by first splitting a scene (e.g. a 3-D model) to be displayed into a number of similar basic components or "primitives", which primitives are then subjected to the desired graphics processing operations. The graphics "primitives" are usually in the form of simple polygons, such as triangles or quadrilaterals, or points or lines.

The graphics primitives are usually generated by the applications program interface (API) for the graphics processing system, using the graphics drawing instructions (requests) received from the application (e.g. game) that requires the graphics processing (render) output.

Each primitive is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

For a given output, e.g. frame to be displayed, to be generated by the graphics processing system, there will typically be a set of vertices defined for the output in question. The primitives to be processed for the output will then be indicated as comprising given vertices in the set of vertices for the graphics processing output being generated. Typically, the overall output, e.g. frame to be generated, will be divided into smaller units of processing, referred to as "draw calls". Each draw call will have a respective set of vertices defined for it and a set of primitives that use those vertices.

Once primitives and their vertices have been generated and defined, they can be processed by the graphics processing system, in order to generate the desired graphics processing output (render output), such as a frame for display.

This basically involves determining which sampling points of an array of sampling points associated with the render output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sample positions that should be used for a primitive (i.e. the (x, y) positions of the sample points to be used to represent the primitive in the output, e.g. scene to be displayed). This is typically done using the positions of the vertices of a primitive.

The rendering process then derives (samples) the data, such as red, green and blue (RGB) colour values and an "Alpha" (transparency) value, necessary to represent the primitive at the sample points (i.e. "shades" each sample point). This can involve, for example, applying textures, blending sample point data values, etc.

(The term "rasterisation" is sometimes used to mean both primitive conversion to sample positions and rendering. However, herein "rasterisation" will be used to refer to converting primitive data to sampling point addresses only.)

These processes are typically carried out by testing sets of one, or more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

Each fragment will typically have "fragment data", such as colour, depth and/or transparency data, associated with it, with the fragment data for a given fragment typically being derived from primitive data associated with (the vertices of) the primitive to which the fragment relates.

A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing are carried out on the rendered image prior to displaying the final image.

It is also the case that as multiple fragments, e.g. from different overlapping primitives, at a given location may affect each other (e.g. due to transparency and/or blending), the final pixel output may depend upon plural or all fragments at that pixel location.

Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.

FIG. 1 shows a typical computer graphics processing system, comprising a host processor (CPU) 1, a graphics processing unit (GPU) 3, and a memory 5 for storing data required by and/or generated by the host processor 1 and graphics processor 3.

When an application 2 that is executing on the host processor 1 requires graphics processing from the graphics processor 3, such as a frame to be displayed, the application 2 will send appropriate commands and data to a driver 4 for the graphics processor 3 that is running on the host processor 1. The driver 4 will then send appropriate commands and data to the graphics processor 3 to cause it to generate the render output required by the application 2. The driver 4 sends commands and data to the graphics processor 3 by writing to the memory 5.

The commands and data provided by the driver 4 will include commands to render primitives for the render output to be generated by the graphics processor 3, together with associated vertex data representing the vertices to be used for the primitives for the render output.

The commands sent to the graphics processor 3 cause the graphics processor 3 to read the vertex data from the memory 5, and process the read vertex data to generate the render output. The graphics processor 3 will typically use the vertex data for a primitive to rasterise the primitive to one or more fragments each (potentially) applying to a region (area) of the render output. The fragments will then be rendered.

The completed render output (e.g. frame) may be written in a frame buffer in the memory 5, from where it may be provided for display on a display device, such as a screen or printer.

When rendering a render output, e.g. frame for display, there is typically a balance between image quality and processing effort. For example, "supersampling" arrangements attempt to increase image quality by increasing the number of colours that are sampled (rendered), but this typically involves a greater processing effort. Conversely, decreasing the number of colours that are sampled (rendered) will usually reduce processing requirements, but at the expense of reduced image quality.

"Variable rate shading" (VRS) is a technique that allows this balance between image quality and processing effort to be varied across a render output, e.g. frame for display. In particular, "variable rate shading" (VRS) allows the area of a render output, e.g. frame, that a single colour is sampled (rendered) for, i.e. the "shading rate", to vary within the render output.

Thus, in "variable rate shading" (VRS), different shading rates can be used to render a render output such that, for example, in some places in the output a single sampled (rendered) colour is used for a single output pixel, whereas elsewhere in the output, the same single sampled (rendered) colour is used for each of plural output pixels in a block of plural output pixels, thereby reducing the processing effort for those pixels.

The Applicants believe that there remains scope for improvements to graphics processors and to graphics processing.

BRIEF DESCRIPTION OF THE DRAWINGS

Various embodiments of the technology described herein will now be described by way of example only and with reference to the accompanying drawings, in which.

Like reference numerals are used for like components where appropriate in the drawings.

DETAILED DESCRIPTION

Figure 1:
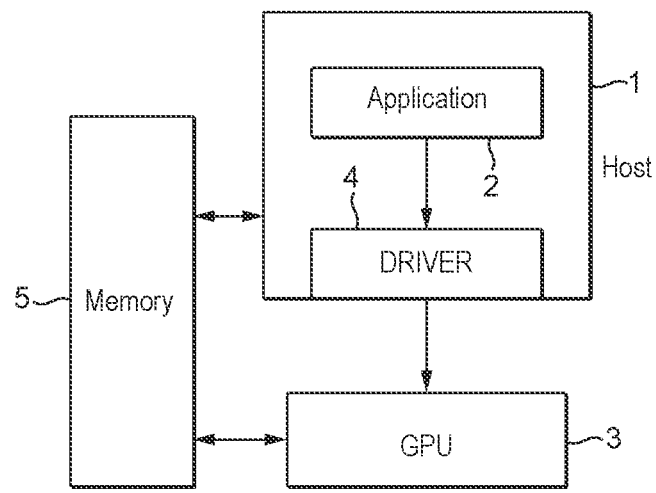
FIG. 1 shows an exemplary graphics processing system.

A first embodiment of the technology described herein comprises a method of operating a graphics processor that is operable to execute a graphics processing pipeline that can generate a render output using different shading rates, wherein the graphics processing pipeline comprises one or more earlier processing stages followed by later processing stages, wherein the later processing stages comprise at least a rasteriser, and a renderer that is operable to render a render output using one or more output shading rates, wherein an output shading rate used by the renderer to render a render output may be determined using plural input shading rates defined for the render output;

the method comprising, when generating a render output for which a plurality of input shading rates have been defined:

combining at least a first input shading rate defined for the render output and a second input shading rate defined for the render output to determine a combined shading rate for the render output prior to the rasteriser stage of the graphics processing pipeline, and providing the determined combined shading rate to one or more of the later processing stages of the graphics processing pipeline;

using the determined combined shading rate when determining an output shading rate to be used by the renderer to render the render output; and the renderer rendering at least some of the render output using the determined output shading rate.

A second embodiment of the technology described herein comprises a graphics processor that is operable to execute a graphics processing pipeline that can generate a render output using different shading rates, wherein the graphics processing pipeline comprises one or more earlier processing stages followed by later processing stages, wherein the later processing stages comprise at least a rasteriser, and a renderer that is operable to render a render output using one or more output shading rates, wherein an output shading rate used by the renderer to render a render output may be determined using plural input shading rates defined for the render output;

wherein the graphics processor comprises a combining circuit prior to the rasteriser stage of the graphics processing pipeline that is configured to combine at least a first input shading rate defined for a render output and a second input shading rate defined for the render output to determine a combined shading rate for the render output, and to cause the determined combined shading rate to be provided to one or more of the later processing stages of the graphics processing pipeline; and wherein the renderer is operable to render at least some of a render output using an output shading rate determined using a combined shading rate determined by the combining circuit.

The technology described herein is concerned with arrangements in which a render output can be generated (rendered) using one or more of plural different possible ("output") shading rates, such as in the case of "variable rate shading" (VRS). That is, the technology described herein is concerned with arrangements in which the area of the render output for which a single colour is rendered (sampled) by the renderer can be one of plural different possibilities.

For example, and in an embodiment, when a relatively fine output shading rate is used, a single colour may be sampled by the renderer for an area of the render output corresponding to only a single pixel. When a coarser output shading rate is used, however, a single colour may be sampled by the renderer for an area of the render output corresponding to a block of plural pixels.

In the technology described herein, an "output" shading rate that the renderer uses, e.g. when rendering a primitive for the render output, is based on a combination of plural "input" shading rates. For example, and as will be discussed in more detail below, the input shading rates for a particular primitive may (and in an embodiment do) include at least an input shading rate defined for the primitive itself (e.g. based on a provoking vertex that the primitive is associated with) (a "per-primitive" input shading rate), an input shading rate defined for (based on) a draw call that the primitive belongs to (a "per-draw call" input shading rate), and an input shading rate defined for (based on) a region of the render output within which the primitive falls (a "per-screen space" input shading rate). The input shading rates are combined to determine a single "final" combined output shading rate that is actually used by the renderer, e.g. when rendering the primitive in question.

In the technology described herein, at least some of the (at least first and second) input shading rates are combined into a single, combined shading rate prior to the rasteriser (and renderer) (i.e. prior to rasterisation).

The Applicants have recognised that while it may typically be the case that one or more input shading rates for a primitive (such as a "per-screen space" shading rate) are determined after (or during) rasterisation of that primitive, such that all of the input shading rates that are to be combined to determine a "final", output shading rate for the primitive can only be guaranteed to be available following rasterisation of the primitive, other input shading rates for the primitive (such as a "per-primitive" shading rate and a "per-draw call" shading rate) may be available prior to rasterisation of the primitive.

This means that it is possible to combine at least some of the input shading rates into a single, e.g. "intermediate" combined shading rate prior to rasterisation. This (e.g. "intermediate") combined shading rate can then be, and is, provided to later processing stages of the graphics processing pipeline (e.g. the rasteriser and/or the renderer), e.g. and in an embodiment, instead of the individual input shading rates that were combined to determine the (e.g. "intermediate") combined shading rate.

As will be discussed in more detail below, any other input shading rates that are determined after (or during) rasterisation, such as a "per-screen space" shading rate, can then be, and in an embodiment are, combined with the "intermediate" combined shading rate following (or during) rasterisation to determine the output shading rate to be used by the renderer.

The Applicants have recognised that combining at least some input shading rates into a single, (e.g. "intermediate") combined shading rate prior to rasterisation, and then propagating the single (e.g. "intermediate") combined shading rate through the graphics processing pipeline in this manner can reduce bandwidth, hardware and energy requirements, e.g. as compared to propagating each of the individual input shading rates through the pipeline and, e.g. only combining them once all of the input shading rates can be guaranteed to be available, i.e. after rasterisation.

The technology described herein can thus provide a graphics processor having reduced bandwidth and hardware requirements and energy consumption. This is generally advantageous, but may be particularly advantageous in contexts in which resources are limited, such as in portable devices, e.g. mobile phones and tablets.

It will be appreciated, therefore, that the technology described herein provides an improved graphics processor.

The render output generated by the graphics processing pipeline of the technology described herein may comprise any suitable render output, such as frame for display, or render-to-texture output, etc. In an embodiment, the render output is an output frame in a sequence of plural output frames that the graphics processing pipeline generates. In this case, each output frame is in an embodiment generated in the manner of the technology described herein.

The render output will typically comprise an array of data elements (sampling points) (e.g. pixels), for each of which appropriate render output data (e.g. a set of colour value data) is generated. The data may comprise, for example, a set of red, green and blue, RGB values and a transparency (alpha, a) value.

The render output may be generated for display on a display device having a display or output comprising a plurality of pixels, such as a computer monitor or a printer. The render output may accordingly include, for each output pixel of the display device, a set of one or more corresponding data elements (sampling points). Each such set of data elements (sampling points) may include only a single data element (sampling point). Alternatively, each set of data elements may include plural data elements (sampling points). In this latter case, each sampling point may effectively correspond to a part of a pixel (e.g. a sub-pixel) of the display device, and the render output may be subjected to an appropriate downsampling operation to generate the output pixel values for displaying the final image on the display device.

The render output should be, and in an embodiment is, rendered by the renderer (circuit) using one or more of plural possible different "output" shading rates. Thus, there is in an embodiment a set of plural possible shading rates that the graphics processor supports and can use.

Correspondingly, there should be, and in an embodiment is, a set of plural possible different sized render output areas for which a single set of colour value data (a single colour) can be sampled (rendered) by the renderer. Accordingly, the renderer rendering at least some of the render output in an embodiment comprises the renderer sampling one or more sets of colour value data (colours), wherein the area of the render output for which each set of colour value data (colour) is sampled has a size in accordance with the respective output shading rate used.

The smallest render output area in the set of plural possible render output areas may be referred to as a "fine pixel", and the other, larger render output areas may be referred to as "coarse pixels". Each "fine pixel" may be the same size and location as a pixel of the output display device. Alternatively, each "fine pixel" may correspond to less than one pixel of the output display device, for example where downsampling is to be applied.

The area of each possible "coarse pixel" in an embodiment corresponds to a block of plural "fine pixels".

The different possible shading rates may be referred to in terms of the number of fine pixels that the shading rate corresponds to. For example, a 1×1 shading rate may signify the finest possible shading mode in which a single set of colour value data is sampled for an area of the render output corresponding to a single fine pixel, whereas a 2×2 shading rate may signify that a single set of colour value data is sampled for an area of the render output corresponding to a block of 2×2 fine pixels.

The set of plural possible shading rates can include any suitable shading rates. In an embodiment, the set of plural possible shading rates includes 1×1, 1×2, 2×1, 2×2, 2×4, 4×2 and 4×4 shading rates. Other shading rates would be possible.

It will be appreciated here that the same output shading rate may be used by the renderer to render all of a render output, or different output shading rates may be used by the renderer to render different regions of a render output.

The render output should be, and in an embodiment is, generated by the graphics processing pipeline processing a set of primitives for the render output. To do this, the rasteriser (circuit) should, and in an embodiment does, rasterise primitives of the set of primitives (to fragments), and the renderer (circuit) should, and in an embodiment does, render (samples colour values for) (fragments generated from) primitives of the set of primitives.

Thus, the first input shading rate, second input shading rate and combined shading rate are in an embodiment shading rates associated with (for) a particular primitive, and the renderer rendering at least some of the render output in an embodiment comprises the renderer rendering (sampling one or more sets of colour value data (colours) for) (one or more fragments generate from) that primitive. In an embodiment, a respective combined shading rate is determined (by the combining circuit) for each of one or more (fragments generated from) primitives of the set of primitives, and the renderer renders such a (fragment generated from a) primitive using a respective output shading rate determined using the respective combined shading rate.

As discussed above, an "output" shading rate that is used by the renderer when rendering the render output should be, and in an embodiment is, based on a combination of a set of "input" shading rates that includes at least a (the) first input shading rate and a (the) second input shading rate. An output shading rate that is used by the renderer may be the same as, or different to, any of the input shading rates that are combined to determine that output shading rate.

An input shading rate can be any suitable shading rate that can be combined with other input shading rate(s) to determine an output shading rate to be used by the renderer (for a particular primitive or fragment). In an embodiment, an input shading rate is a shading rate that is specified by an application that the render output is being generated for, and in an embodiment that the graphics processor (pipeline) can determine directly (i.e. without combining shading rates) from commands and data issued to it (e.g. by a driver for the graphics processor).

The arrangement is in an embodiment such that plural input shading rates are specified (by the application) based on different factors, such that plural input shading rates apply to the same primitive (or fragment), and so are combined (by the graphics processor (pipeline)) to determine a single output shading rate for use by the renderer when rendering that primitive (or fragment). Thus the input shading rates that are combined (including the first and second input shading rates) to determine a combined shading rate should be, and in an embodiment are, shading rates that are based on different factors, but which all apply to the same primitive (or fragment).

In an embodiment, an input shading rate is specified (by the application) for each of one or more vertices, with each such input shading rate applying to any primitives that are associated with (comprise) the respective vertex. Thus, the set of input shading rates in an embodiment includes a "per-primitive" shading rate.

In an embodiment, an input shading rate is (additionally or alternatively) specified (by the application) for each of one or more draw calls, with each such input shading rate applying to any primitives that belong to the respective draw call. Thus, the set of input shading rates in an embodiment includes a "per-draw call" shading rate.

In an embodiment, an input shading rate is (additionally or alternatively) specified (by the application) for each of one or more regions of the render output, with each such input shading rate applying to any primitives (or fragments) that appear within the respective render output region. Thus, the set of input shading rates in an embodiment includes a "per-screen space" shading rate.

Thus, in an embodiment, the graphics processor (pipeline) determines an output shading rate that the renderer uses when rendering a (each) primitive (or fragment) by combining (from) a "per-primitive" shading rate, a "per-draw call" shading rate and a "per-screen space" shading rate that apply to the (respective) primitive (or fragment).

However, other input shading rates would be possible. For example, a "per-depth" shading rate could (additionally or alternatively) be specified for each of one or more Z depth ranges, with each such input shading rate applying to any primitives (or fragments) having a Z depth within the respective Z depth range, e.g. as described in U.S. patent application Ser. No. 16/897,160, the entire contents of which is hereby incorporated by reference.

In the technology described herein, at least first and second input shading rates are combined prior to the rasteriser stage to determine a combined shading rate. These input shading rates (i.e. at least the first and second input shading rates) should thus be, and in an embodiment are, input shading rates that can be determined (directly) for a primitive prior to the primitive being rasterised.

In this regard, as mentioned above, the Applicants have recognised that some "input" shading rates may be available (determinable) prior to rasterisation, whereas the graphics processor (pipeline) may determine other "input" shading rates based on information determined by the rasterisation process, such that these latter "input" shading rates may not be available prior to rasterisation.

For example, in the case of a set of "per-screen space" input shading rates being specified, with each such "per-screen space" input shading rate applying to any primitives (or fragments) that appear within a corresponding region of the render output, the "per-screen space" input shading rate that applies to a particular primitive will depend on the position in the render output at which the primitive appears, and the position in the render output at which the primitive appears will be determined by rasterising the primitive. Thus, a "per-screen space" input shading rate will typically not be available prior to rasterisation. Similarly, a "per-depth" input shading rate may typically not be available prior to rasterisation.

In contrast, "per-primitive" and "per-draw call" input shading rates will typically not depend on information determined by the rasterisation process, and thus will typically be available (determinable) prior to rasterisation.

Thus, in an embodiment, the first input shading rate is a "per-primitive" shading rate, and the second input shading rate is a "per-draw call" shading rate.

Where the set of input shading rates includes only shading rates that are available prior to rasterisation (such as only the first and second input shading rates), then all of the input shading rates may be, and in an embodiment are, combined prior to rasterisation (by the combining circuit). Thus, in an embodiment, the combined shading rate that is determined by (the combining circuit) combining at least the first and second input shading rates is the output shading rate that is used by the renderer. Thus, using the determined combined shading rate when determining an output shading rate to be used by the renderer to render the render output in an embodiment comprises using the determined combined shading rate as the output shading rate.

However, as mentioned above, where the set of input shading rates includes one or more input shading rates that are not available prior to rasterisation, then those one or more input shading rates may be, and in an embodiment are, combined with the other input shading rates after (or during) rasterisation.

In one such embodiment, the arrangement is such that all input shading rates that are available prior to rasterisation are combined to determine an "intermediate" combined shading rate prior to rasterisation (in an embodiment by the (first) combining circuit), and then all of the input shading rates that are not available prior to rasterisation are combined with this "intermediate" combined shading rate after (or during) rasterisation (in an embodiment by a second combining circuit) to determine the "final" combined output shading rate that is actually used by the renderer.

In this regard, the Applicants have recognised that since it is possible to combine first, second and third input shading rates to determine an output shading rate by performing a first "partial" combining operation that combines the first and second input shading rates into an "intermediate" combined shading rate, and then performing a second "partial" combining operation that combines the "intermediate" combined shading rate with the third (or more) input shading rate to determine the "final" combined output shading rate, it is possible to perform the first and second "partial" combining operations at different processing stages of the graphics processing pipeline. Embodiments of the technology described herein exploit this by performing the first "partial" combining operation prior to the rasteriser stage, and the second "partial" combining operation at or after the rasteriser stage.

Thus, in an embodiment, the combined shading rate that is determined by (the (first) combining circuit) combining at least the first and second input shading rates represents an "intermediate" combined shading rate, which "intermediate" combined shading rate is then combined with at least a third input shading rate after (or during) rasterisation to determine a second combined shading rate that is in an embodiment the "final" output shading rate that is actually used by the renderer.

Thus, using the determined combined shading rate when determining an output shading rate to be used by the renderer to render the render output in an embodiment comprises combining at least the determined combined shading rate and a third input shading rate defined for the render output to determine the output shading rate at or after the rasteriser stage of the graphics processing pipeline.

In an embodiment, the third input shading rate is a "per-screen space" shading rate.

It is believed that the idea of combining at least first, second and third shading rates by performing first and second "partial" combining operations at different processing stages of the graphics processing pipeline in this manner may be novel and inventive in its own right.

Thus, another embodiment of the technology described herein comprises a method of operating a graphics processor that is operable to execute a graphics processing pipeline that can generate a render output using different shading rates, wherein the graphics processing pipeline comprises one or more earlier processing stages followed by one or more later processing stages, wherein the one or more later processing stages comprise at least a renderer that is operable to render a render output using one or more output shading rates, wherein an output shading rate used by the renderer to render a render output may be determined using plural input shading rates defined for the render output;

the method comprising, when generating a render output for which a plurality of input shading rates have been defined:

combining at least a first input shading rate defined for the render output and a second input shading rate defined for the render output to determine an intermediate combined shading rate for the render output prior to the one or more later processing stages of the graphics processing pipeline, and providing the determined intermediate combined shading rate to one or more of the one or more later processing stages of the graphics processing pipeline;

combining at least the determined intermediate combined shading rate and a third input shading rate defined for the render output to determine an output shading rate for the render output at or after a processing stage of the one or more later processing stages of the graphics processing pipeline; and the renderer rendering at least some of the render output using the determined output shading rate.

Another embodiment of the technology described herein comprises a graphics processor that is operable to execute a graphics processing pipeline that can generate a render output using different shading rates, wherein the graphics processing pipeline comprises one or more earlier processing stages followed by one or more later processing stages, wherein the one or more later processing stages comprise at least a renderer that is operable to render a render output using one or more output shading rates, wherein an output shading rate used by the renderer to render a render output may be determined using plural input shading rates defined for the render output;

wherein the graphics processor comprises:

a first combining circuit prior to the one or more later processing stages of the graphics processing pipeline that is configured to combine at least a first input shading rate defined for a render output and a second input shading rate defined for the render output to determine an intermediate combined shading rate for the render output, and to cause the determined intermediate combined shading rate to be provided to one or more of the one or more later processing stages of the graphics processing pipeline; and a second combining circuit at or after a processing stage of the one or more later processing stages of the graphics processing pipeline that is configured to combine at least an intermediate combined shading rate determined by the first combining circuit for a render output and a third input shading rate defined for the render output to determine an output shading rate for the render output;

wherein the renderer is operable to render at least some of a render output using an output shading rate determined by the second combining circuit.

These embodiments can include, as appropriate, any one or more or all of the optional features described herein. For example, the first input shading rate may be a "per-primitive" shading rate, the second input shading rate may be a "per-draw call" shading rate, and the third input shading rate may be a "per-screen space" shading rate. Moreover, the later processing stages may comprise a rasteriser. However, a graphics processing pipeline that does not necessarily include a rasteriser, such as a ray tracing graphics processing pipeline, is also contemplated.

In an embodiment, shading rates are combined into a single combined shading rate according to one or more combining functions that are in an embodiment specified by the application that the render output is being generated for. A combining function may combine different shading rates by, for example, selecting one of the shading rates, such as the finest or coarsest shading rate, or by determining an average shading rate. In an embodiment, an input and/or an output of a combining function is "sanitized", i.e. mapped to a, e.g. the nearest, shading rate supported by the graphics processor.

Thus, in an embodiment, the at least the first input shading rate and the second input shading rate are combined to determine the single (e.g. "intermediate") combined shading rate according to a (defined) combining function.

In an embodiment, a first combining function is specified (by the application) for (and used when) combining the at least the first and second input shading rates to determine the "intermediate" combined shading rate, and a second combining function is specified (by the application) for (and used when) combining the at least the "intermediate" combined shading rate and the third input shading rate to determine the output combined shading rate.

Once an (e.g. "intermediate") combined shading rate has been determined (prior to rasterisation) (by the combining circuit), the determined combined shading rate is provided to one or more of the later processing stages (e.g. the rasteriser and/or renderer). It will be appreciated here that this means that the individual input shading rates that were combined to determine the (e.g. "intermediate") combined shading rate do not need to be provided to the later processing stage(s). Thus, the individual (including first and second) input shading rates that were combined to determine the (e.g. "intermediate") combined shading rate are in an embodiment not provided (other than provided) to the later processing stage(s).

Similarly, in an embodiment, the second combining function is in an embodiment provided to the later processing stage(s) (e.g. the rasteriser and/or renderer), but the first combining function is in an embodiment not provided (other than provided) to the later processing stage(s). This can provide a reduction in terms of bandwidth, hardware, and energy requirements.

The graphics processing pipeline that the graphics processor executes can include any suitable and desired processing stages for generating a (the) render output (e.g. frame). Thus, the graphics processing pipeline can include, and in an embodiment does include, in addition to the rasteriser (stage) and/or renderer (stage), any one or one or more, and in an embodiment all, of the other processing stages that graphics processing pipelines normally include.

In an embodiment, the graphics processing pipeline comprises one or more vertex processing stages (circuits) that are operable to receive and process raw vertex data to generate transformed vertex data. In an embodiment, the graphics processing pipeline comprises, in an embodiment (logically) after the one or more vertex processing stages, one or more primitive setup stages (circuits) that are operable to use transformed vertex data generated by the one or more vertex processing stages to setup primitives for rasterisation.

The rasteriser (circuit) is then in an embodiment (logically) after the one or more primitive setup stages (and the one or more vertex processing stages) in the graphics processing pipeline, and rasterises primitive setup for rasterisation by the one or more primitive setup stages to generate fragments. Each fragment that is generated by the rasteriser should, and in an embodiment does, have associated with it a set of data elements (sampling points) of the render output, and may be used by the renderer to generate render output data for one or more of the data elements (sampling points) of the set of data elements (sampling points) associated with the fragment.

The renderer (circuit) is thus in an embodiment (logically) after the rasteriser (and the one or more vertex processing stages and the one or more primitive setup stages) in the graphics processing pipeline, and renders fragments generated by the rasteriser. To do this, the renderer in an embodiment comprises one or more fragment processing stages.

The graphics processor (and pipeline) may be an immediate mode graphics processor (and pipeline). However, in an embodiment, the graphics processor (and pipeline) is a tile-based graphics processor (and pipeline). The graphics processor (and pipeline) thus in an embodiment generates the render output on a tile-by-tile basis. The render output (area) may thus be divided into plural rendering tiles for rendering purposes.

The tiles that the render output is divided into for rendering purposes can be any suitable and desired such tiles. The size and shape of the rendering tiles may normally be dictated by the tile configuration that the graphics processor is configured to use and handle.

The rendering tiles are in an embodiment all the same size and shape (i.e. regularly-sized and shaped tiles are in an embodiment used), although this is not essential. The tiles are in an embodiment rectangular, and in an embodiment square. The size and number of tiles can be selected as desired. In an embodiment, each tile is 16×16, or 32×32 data elements (e.g. fragments or pixels) in size (with the render output then being divided into however many such tiles as are required for the render output size and shape that is being used).

To facilitate tile-based graphics processing, the graphics processor in an embodiment comprises one or more tile buffers that store rendered data for a rendering tile being rendered by the graphics processing pipeline, until the graphics processing pipeline completes the rendering of the rendering tile. The tile buffer should be, and in an embodiment is, provided local to (i.e. on the same chip as) the graphics processor, for example, and in an embodiment, as part of RAM that is located on (local to) the graphics processor (chip). The tile buffer may accordingly have a fixed storage capacity, for example corresponding to the data (e.g. for an array or arrays of sample values) that the graphics processor needs to store for (only) a single rendering tile until the rendering of that tile is completed.

Moreover, in an embodiment, the graphics processing pipeline comprises a primitive list preparing stage (circuit) (a "tiler") that prepares primitive lists for respective regions of the render output. The regions of the render output that the primitive list preparing stage (circuit) ("tiler") can prepare primitive lists for may correspond e.g. to single rendering tiles, or to sets of plural rendering tiles (e.g. in the case of "hierarchical tiling" arrangements).

In this case, the primitive list preparing stage in an embodiment receives transformed vertex data generated by the one or more vertex processing stages of the graphics processing pipeline, and uses the transformed vertex data to prepare primitive lists.

In an embodiment, the primitive list preparing stage (circuit) is followed by a primitive list reading stage (circuit) in the graphics processing pipeline that reads primitives listed for a rendering tile by the primitive list preparing stage (circuit) ("tiler"), and passes those read primitives to subsequent stages of the graphics processing pipeline for processing, which subsequent stages of the graphics processing pipeline in an embodiment comprise the one or more primitive setup stages.

Thus, the primitive list preparing stage (circuit) and primitive list reading stage (circuit) are in an embodiment (logically) between the one of more vertex processing stages (circuits) and the one or more primitive setup stages (circuits) in the graphics processing pipeline, and primitives read by the primitive list reading stage are in an embodiment setup up for rasterisation by the one or more primitive setup stages, and are then rasterised to fragments by the rasteriser, etc.

Thus, the one or more earlier processing stages of the graphics processing pipeline (that are prior to the rasteriser stage) in an embodiment comprise one or more, and in an embodiment all, of: one or more vertex processing stages; a primitive list preparing stage; a primitive list reading stage; and one or more primitive setup stages. The later processing stages of the graphics processing pipeline in an embodiment comprise the rasteriser and the renderer, which in an embodiment comprises one or more fragment processing stages.

It will be appreciated here that a later processing stage refers to a processing stage of the graphics processing pipeline that may perform its respective processing operation(s) (in respect of a primitive) after an earlier processing stage, and thus may use a processing result generated by an earlier processing stage.

As discussed above, in the technology described herein at least first and second input shading rates are combined to determine a combined shading rate (prior to the rasteriser stage of the graphics processing pipeline). This (first) combining operation may be performed by any suitable and desired stage or component of the graphics pipeline or processor.

For example, the one or more earlier processing stages of the graphics processing pipeline (that are prior to the rasteriser stage) may comprise a "standalone" (first) combining stage (circuit) that performs the (first) combining operation (prior to the rasteriser stage). Alternatively, one of the earlier processing stages of the graphics processing pipeline (prior to the rasteriser stage) may perform the (first) combining operation, e.g. in addition to the other processing operation(s) that the processing stage is operable to perform. For example, a vertex processing stage or primitive setup stage of the graphics processing pipeline may combine the first and second input shading rates to determine a combined shading rate (prior to the rasteriser stage).

In an embodiment (where the graphics processing pipeline is tile-based), the primitive list preparing stage (circuit) (the "tiler") combines at least the first input shading rate and the second input shading rate to determine the (e.g. "intermediate") combined shading rate. In an embodiment, the primitive list preparing stage (circuit) comprises a (first) combining circuit for this purpose.

In this regard, the Applicants have recognised that a primitive list preparing stage ("tiler") of a tile-based graphics processing pipeline may typically be the earliest processing stage of the pipeline where e.g. "per-primitive" and "per-draw call" input shading rates for a primitive are available. As such, combining these input shading rates in the primitive list preparing stage ("tiler") can minimise the propagation of individual e.g. "per-primitive" and "per-draw call" shading rates through the pipeline, and thus minimise bandwidth, hardware and energy requirements.

As also discussed above, in embodiments of the technology described herein at least a combined shading rate (determined prior to the rasterisation stage) and a third shading rate are combined to determine an output shading rate (at or after the rasteriser stage of the graphics processing pipeline). This (second) combining operation may be performed by any suitable and desired stage or component of the graphics pipeline or processor.

For example, the later processing stages of the graphics processing pipeline may comprise a "standalone" second combining stage (circuit) that performs the (second) combining operation (at or after the rasteriser stage). Alternatively, one of the later processing stages of the graphics processing pipeline may perform the (second) combining operation, e.g. in addition to the other processing operation(s) that the processing stage is operable to perform. For example, a fragment processing stage of the renderer may combine the determined combined shading rate and third input shading rate to determine an output shading rate.

In an embodiment, the rasteriser (circuit) combines at least a combined shading rate (determined prior to the rasterisation stage) and a third input shading rate to determine the output (combined) shading rate. In an embodiment, the rasteriser (circuit) comprises a second combining circuit for this purpose (and the combining circuit that combines the first and second input shading rates (prior to the rasteriser stage) is in an embodiment a (in an embodiment different) first combining circuit).

In this regard, the Applicants have recognised that a rasteriser of a graphics processing pipeline may typically be the earliest processing stage of the pipeline where e.g. "per-screen space" input shading rates are available. As such, combining a e.g. "per-screen space" input shading rate in the rasteriser can minimise the propagation of individual e.g. "per-screen space" shading rates through the pipeline, and thus minimise bandwidth, hardware and energy requirements.

As also discussed above, in the technology described herein a combined shading rate (determined (by an earlier processing stage) prior to the rasterisation stage) is provided to a later processing stage. Where the determined combined shading rate is used as the output shading rate, the determined combined shading rate should be, and in an embodiment is, provided to the renderer so that the renderer can then use that output shading rate when rendering the render output.

Where the determined combined shading rate is combined with at least a third input shading rate to determine the output shading rate, the determined combined shading rate should be, and in an embodiment is, provided to the later processing stage that performs the (second) combining operation. Thus, the combined shading rate (determined prior to the rasteriser stage) is in an embodiment provided to the (second combining circuit of the) rasteriser. In this case, the output combined shading rate determined by the (second combining circuit of the) rasteriser should be, and in an embodiment is, provided to the renderer so that the renderer can then use that output shading rate when rendering the render output.

As also discussed above, a second combing function may also be, and is in an embodiment, provided to the later processing stage (in an embodiment the (second combining circuit of the) rasteriser) that performs the (second) combining operation (at or after the rasterisation stage).

A (combined) shading rate and/or a (second) combining function can be provided to a later processing stage in any suitable and desired manner. In an embodiment, shading rate information propagates from the earlier "originating" processing stage to the later "receiving" processing stage through any "intermediate" processing stages that are (logically) between the originating and receiving processing stages in the graphics processing pipeline. This may involve, for example, shading rate information propagating from a processing stage to the next by the processing stage writing shading rate information to storage (such as to one or more registers) that the next processing stage can access, and the next processing stage reading that shading rate information (and writing the shading rate information to storage), and so on.

In an embodiment, any such "intermediate" processing stage will, as well as propagate shading rate information for a primitive to the next processing stage, perform a respective processing operation in respect of the primitive, which processing operation in an embodiment does not use the shading rate information.

Thus, in an embodiment, the graphics processing pipeline comprises, (logically) between the (first) combining circuit (e.g. earlier processing stage, in an embodiment the primitive list preparing stage) that determines the ("intermediate") combined shading rate and the (later) second combining circuit (e.g. later processing stage, in an embodiment the rasteriser) that determines the output combined shading rate, one or more, and in an embodiment plural, intermediate processing stages that are each operable to perform a respective processing operation which does not use the ("intermediate") combined shading rate information, and in an embodiment to propagate the ("intermediate") combined shading rate information to the next processing stage.

In embodiments where the combined shading rate is determined by (the "originating" processing stage is) the primitive list preparing stage (circuit), providing the determined combined shading rate (and optionally the second combining function) in an embodiment involves the primitive list preparing stage (the "tiler") writing information indicative of the (e.g. "intermediate") combined shading rate (and optionally the second combining function) to one or more primitive lists. In an embodiment, the primitive list reading stage then reads this information when reading primitive lists, and the information propagates to subsequent processing stages (including the rasteriser and/or renderer), e.g. as discussed above.

The primitive list preparing stage (circuit) (the "tiler") could write shading rate indicative information for each and every primitive listed in the primitive lists. However, in an embodiment, the primitive list preparing stage (circuit) (the "tiler") writes shading rate indicative information for a primitive to a primitive list only when the shading rate for that primitive is different to the shading rate for a previous primitive written to that primitive list. That is, in an embodiment, the primitive list preparing stage ("tiler") only writes information indicative of the shading rate to a primitive list when there is a change of shading rate.

Thus, the primitive list preparing stage (circuit) (the "tiler") in an embodiment comprises a primitive list writing circuit that is configured to determine whether a shading rate for a current primitive to be written to a primitive list is different to a shading rate for a previous primitive written to the primitive list, and to, when it is determined that a shading rate for a current primitive to be written to a primitive list is different to a shading rate for a previous primitive written to the primitive list, write information indicative of the shading rate for the current primitive to the primitive list.

In an embodiment, the primitive list writing circuit is configured to, when it is not determined that a shading rate for a current primitive to be written to a primitive list is different to a shading rate for a previous primitive written to the primitive list (when it is determined that the shading rate for the current primitive is the same as the shading rate for the previous primitive), not write (omit writing) information indicative of the shading rate for the current primitive to the primitive list. This can further reduce energy, hardware and bandwidth requirements.

The shading rate indicative information that the primitive list preparing stage (circuit) (the "tiler") writes to one or more primitive lists could comprise the actual determined (e.g. "intermediate") combined shading rate (and optionally the second combining function). However, in an embodiment, the shading rate indicative information comprises a compressed representation of a determined (e.g. "intermediate") combined shading rate (and optionally a second combining function). This can further reduce bandwidth, hardware and energy requirements.

Thus, in an embodiment, a compressed representation of the (e.g. "intermediate") combined shading rate (and optionally the second combining function) is determined (prior to the rasterisation stage), and the compressed representation of the (e.g. "intermediate") combined shading rate (and optionally the second combining function) is provided to the later processing stage(s) (in an embodiment instead of the actual "uncompressed" combined shading rate).

To facilitate this, the graphics processor in an embodiment comprises a shading rate compressing circuit that is configured to compress a (combined) shading rate (and optionally a combining function) to determine a compressed representation of the (combined) shading rate (and optionally the combining function) (prior to the rasteriser stage of the graphics processing pipeline), and in an embodiment to provide the compressed representation of the (combined) shading rate to the later processing stage(s). In an embodiment, the shading rate compressing circuit compresses a combined shading rate determined by the (first) combining circuit. In an embodiment, the primitive list preparing stage (circuit) (the "tiler") comprises the shading rate compressing circuit, in an embodiment as well as the (first) combining circuit.

Correspondingly, the graphics processor in an embodiment comprises a shading rate decompressing circuit that is configured to decompress a compressed representation of a (combined) shading rate (and optionally a second combining function) to determine the (combined) shading rate (and optionally the combining function) (at or after the rasteriser stage of the graphics processing pipeline). In an embodiment, the rasteriser (circuit) or (a fragment processing stage of the) renderer (circuit) comprises the shading rate decompressing circuit, in an embodiment as well as the second combining circuit.

A compressed representation of a (combined) shading rate can be provided in any suitable form. In an embodiment, each shading rate of the set of plural possible shading rates that the graphics processor supports is encoded as a respective bit pattern of a set of bits. A further bit pattern of the set of bits may be used to encode the case where "variable rate shading" (VRS) is disabled.

Similarly, a compressed representation of a (second) combing function can be provided in any suitable form. In an embodiment, each possible combing function is encoded as a respective bit pattern of a set of bits. In an embodiment, a further bit pattern of the set of bits that encodes a (second) combing function is used to encode the case where "variable rate shading" (VRS) is disabled.

Thus, in an embodiment, shading rate indicative information written by the primitive list preparing stage (circuit) can indicate that "variable rate shading" (VRS) is disabled. In this case, the primitive list preparing stage (circuit) is in an embodiment configured to, when "variable rate shading" (VRS) is disabled, not write (omit writing) information indicative of individual shading rates (and (only) write information that indicates that "variable rate shading" (VRS) is disabled), and the primitive list reading stage (circuit) is in an embodiment configured to, in response to reading shading rate indicative information that indicates that "variable rate shading" (VRS) is disabled, provide information to subsequent processing stages of the graphics processing pipeline that indicates that the finest possible shading rate (1×1) should be used (as an "output" shading rate). This arrangement can reduce the amount of information that is written and read, and thus bandwidth requirements and energy consumption, when "variable rate shading" (VRS) is disabled.

Once an "output" shading rate has been determined (from plural "input" shading rates), the renderer should, and in an embodiment does, use that output shading rate when rendering a primitive for the render output. This should, and in an embodiment does, have the effect that a greater number of colours are sampled by the renderer when a finer output shading rate is determined, as compared to when a coarser output shading rate is determined. This can be achieved in any suitable and desired manner.

For example, the rasteriser could rasterise primitives into fragments based on shading rate, such that the area of the render output that a fragment generated by the rasteriser corresponds to varies according to shading rate. Thus, in an embodiment, the rasteriser rasterises a primitive according to the output shading rate. For example, the rasteriser could generate fragments that correspond to larger areas of the render output when a coarser output shading rate is used, and generate fragments that correspond to smaller areas of the render output when a finer output shading rate is used. The renderer may then sample a single set of colour value data (a single colour) for each so-generated fragment. This will then have the effect that a greater number of fragments are generated, and so colours are sampled, when a finer shading rate is used, as compared to when a coarser shading rate is used.

In an embodiment, the rasteriser is operable to generate fragments in the "normal" manner. That is, in an embodiment, the rasteriser (always) operates to generate fragments that each correspond to the same sized area of the render output, e.g. corresponding to one pixel or sub-pixel (a "fine pixel") irrespective of the output shading rate used. Fragments generated in this way are then in an embodiment "combined" according to the output shading rate into sets of one or more fragments, and a single set of colour value data (a single colour) is sampled for each such set of one or more fragments. For example, and in an embodiment, a greater number of fragments are included in a set of fragments when a coarser output shading rate is used, as compared to when a finer output shading rate is used. This will then have the effect that a greater number of colours are sampled when a finer shading rate is used, as compared to when a coarser shading rate is used.

Once a colour (set of colour value data) has been sampled by the renderer (circuit), the colour should be, and in an embodiment is, "broadcast" to each (e.g. covered) sampling position in the render output that the colour applies to. This should, and in an embodiment does, have the effect that a single colour will be used for more sampling positions in the render output when a coarser output shading rate is used, as compared to when a finer output shading rate is used.

In an embodiment, render output data is "broadcast" to each corresponding sampling position in an output buffer, e.g. the tile buffer. This may comprise writing render output data produced by the renderer (directly) to the output (e.g. tile) buffer based on the output shading rate. Alternatively, where blending is required, a blender stage of the graphics processing pipeline may appropriately blend render output data newly generated by the renderer with render output data already stored in the output (e.g. tile) buffer based on the output shading rate.

The graphics processor may execute any suitable and desired graphics processing pipeline, and may and in an embodiment does, include any suitable and desired processing circuits, processing logic, components and elements for that purpose.

A (and each) processing stage (circuit) of the graphics processing pipeline (processor) can be implemented as desired, e.g. as a fixed function hardware unit (circuit) (i.e. a circuit that is dedicated to one or more functions that cannot be changed) or as a programmable processing circuit (that is programmed to perform the desired operation).

For example, the primitive list preparing stage (the "tiler") may be a fixed function tiling unit (circuit), and vertex and fragment processing stages may be executed by one or more programmable execution units (shader cores) of the graphics processor.

Thus, in an embodiment, the graphics processor comprises one or more programmable execution units (shader cores), which can, and in an embodiment do, each execute one or more of the processing stages of the graphics processing pipeline. Where the graphics processor comprises plural programmable execution units (shader cores), then different programmable execution units may execute the same or different processing stages of the graphics processing pipeline independently and at the same time (in parallel). Thus, plural instances of the graphics processing pipeline may be executed in parallel.

As will be appreciated by those skilled in the art, the graphics processor of the technology described herein may be part of an overall graphics processing system that includes, e.g., and in an embodiment, a host processor that, e.g., executes applications that require processing by the graphics processor. The host processor will send appropriate commands and data to the graphics processor to control it to perform graphics processing operations and to produce graphics processing output required by applications executing on the host processor. To facilitate this, the host processor should, and in an embodiment does, also execute a driver for the graphics processor and optionally a compiler or compilers for compiling (e.g. shader) programs to be executed by (e.g. a programmable execution unit of) the graphics processor.

The graphics processor may also comprise, and/or be in communication with, one or more memories and/or memory devices that store the data described herein, and/or the output data generated by the graphics processor, and/or store software (e.g. (shader) program) for performing the processes described herein. The graphics processor may also be in communication with a host microprocessor, and/or with a display for displaying images based on the data generated by the graphics processor.

The technology described herein can be used for all forms of output that a graphics processor (and processing pipeline) may be used to generate. For example, the graphics processing pipeline may generate frames for display, render-to-texture outputs, etc. The output data values from the processing are in an embodiment exported to external, e.g. main, memory, for storage and use, such as to a frame buffer for a display.

The technology described herein is applicable to any suitable form or configuration of graphics processor and graphics processing system. It is particularly applicable to tile-based graphics processors and graphics processing systems. Thus in an embodiment, the graphics processor is a tile-based graphics processor (and pipeline).

In an embodiment, the various functions of the technology described herein are carried out on a single graphics processing platform that generates and outputs data (such as rendered fragment data that is, e.g., written to the frame buffer), for example for a display device.

The technology described herein can be implemented in any suitable system, such as a suitably configured microprocessor based system. In an embodiment, the technology described herein is implemented in a computer and/or micro-processor based system.

The technology described herein is in an embodiment implemented in a portable device, such as, and in an embodiment, a mobile phone or tablet.

The various functions of the technology described herein can be carried out in any desired and suitable manner. For example, the functions of the technology described herein can be implemented in hardware or software, as desired. Thus, for example, the various functional elements, stages, and "means" of the technology described herein may comprise a suitable processor or processors, controller or controllers, functional units, circuitry, circuit(s), processing logic, microprocessor arrangements, etc., that are operable to perform the various functions, etc., such as appropriately dedicated hardware elements (processing circuit(s)) and/or programmable hardware elements (processing circuit(s)) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuit(s), etc., if desired.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

An embodiment of the technology described herein will now be described with reference to the Figures.

When a computer graphics image is to be displayed, it is usually first defined as a series of primitives (polygons), which primitives are then rasterised into graphics fragments for graphics rendering in turn. These fragments are the processing entities that pass through the rendering process (the renderer). During a normal graphics rendering operation, the renderer typically samples a single colour (e.g. a set of red, green and blue, RGB values and a transparency (alpha, a) value) for each fragment so that the fragments can be displayed correctly. Once the fragments have fully traversed the renderer, then their associated colour values are stored in memory, ready for output, e.g. for display on a display device.

Each graphics fragment will typically be the same size and location as a "pixel" of the output display device. Alternatively, each graphics fragment may effectively correspond to less than one pixel of the output display device, for example where downsampling is to be applied.

Thus, the rendering process may typically produce a render output comprising an array of sampling points, for each of which appropriate data (e.g. a set of colour value data) is generated. For each output pixel, there is typically a set of one or more corresponding sampling points in the render output. Each such set of sampling points may include only one sampling point, or where downsampling is used, each set of sampling points may include plural sampling points.

As discussed above, "variable rate shading" (VRS) is a technique that allows different shading rates to be used to render a render output, i.e. such that a single colour (set of colour value data) can be sampled (rendered) for one of plural possible different sized areas in a render output. For example, a single colour may be sampled for an area of the render output corresponding to only a single pixel, or a single colour may be sampled for an area of the render output corresponding to each pixel in a block of plural pixels.

Sampling (rendering) a single colour and applying it to plural sampling points (e.g. pixels) will reduce the processing effort required for those sampling points, as compared to sampling an individual colour for each sampling point, but will usually come at the expense of reduced image quality.

In "variable rate shading" (VRS), there will typically be a set of plural possible shading rates that a graphics processor supports and is able to use. That is, there will typically be a set of plural possible different sized render output areas that a single colour (set of colour value data) can be sampled for. The smallest possible of these render output areas may be referred to as a "fine pixel", and the other, larger render output areas may be referred to as "coarse pixels".

Each "fine pixel" will typically be the same size and location as a pixel of the output display device. However, it is also possible for each "fine pixel" to effectively correspond to less than one pixel of the output display device, for example where downsampling is to be applied.

The area of each possible "coarse pixel" typically corresponds to a block of plural "fine pixels". The different possible shading rates are then referred to in terms of the number of fine pixels that the shading rate corresponds to. For example, a 1×1 shading rate will signify the finest possible shading mode in which a single colour should be sampled for a single fine pixel, whereas a 2×2 shading rate will signify that a single colour should be sampled for an area corresponding to a block of 2×2 fine pixels. A graphics processor may typically support 1×1, 1×2, 2×1, 2×2, 2×4, 4×2 and 4×4 shading rates, for example.

Figure 2:
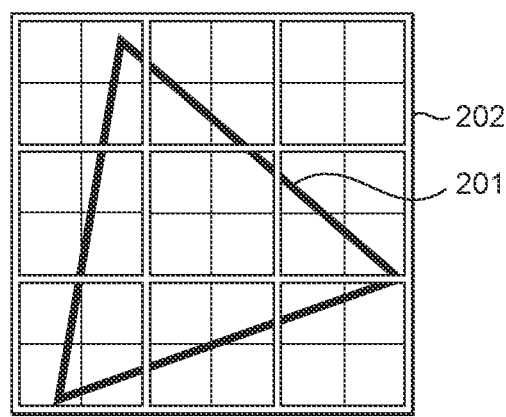
FIG. 2 illustrates an exemplary primitive being rendered according to different shading rates.

FIG. 2 illustrates a comparison of an exemplary primitive 201 being rendered using 1×1 and 2×2 shading rates. FIG. 2 shows the location of the exemplary primitive 201 to be rendered relative to a 6×6 block of fine pixels 202. Each small square represents one of the fine pixels of the "variable rate shading" (VRS) process.

In the case of a 1×1 shading rate, the rendering process samples (renders) a single colour (set of colour value data) for each fine pixel that a primitive covers. In this case, the primitive 201 is visible in (covers) 23 out of the 36 illustrated fine pixels, and so the rendering process will sample a total of 23 colours (sets of colour value data).

Each larger square in FIG. 2 represents one 2×2 coarse pixel that is used in the 2×2 shading rate process. Each 2×2 coarse pixel encompasses a block of 2×2 fine pixels. In this case, the rendering process samples (renders) a single colour (set of colour value data) for each such coarse pixel that a primitive covers. In this case, the primitive 201 covers 8 out of the 9 illustrated 2×2 coarse pixels, and so the rendering process will sample only 8 colours (sets of colour values).

Thus, it will be appreciated that a coarser shading rate is associated with a lower density of rendered colours as compared to a finer shading rate. Moreover, it will be appreciated that rendering the primitive 201 using a coarser shading rate will reduce processing requirements, as compared to rendering the primitive 201 using a finer shading rate. However, this will typically come at the expense of reduced image quality.

A graphics processor will typically determine the shading rate that it uses to render a primitive 201 based on a combination of plural "input" shading rates specified for that primitive by an application that the render output is being generated for. The final, "output" shading rate that the graphics processor actually uses thus typically represents a combined shading rate.

As discussed above, the Applicants have recognised that propagating a single shading rate through a graphics processing pipeline will reduce bandwidth, hardware and energy requirements as compared to propagating plural shading rates through the pipeline. Accordingly, the overall bandwidth, hardware and energy requirements of a graphics processing pipeline can be reduced by combining plural input shading rates into a single, combined shading rate at a relatively early point in the pipeline, and then propagating the combined shading rate through the pipeline, as compared to propagating the plural input shading rates through the pipeline and then combining the plural input shading rates into the single combined shading rate at a later point in the pipeline.

Embodiments of the technology described herein exploit this by combining plural input shading rates that are available prior to rasterisation into a single "intermediate" combined shading rate prior to rasterisation, and then later in the pipeline (i.e. during or after rasterisation), combining the "intermediate" combined shading rate with any input shading rates that are determined during or after rasterisation, to determine an output combined shading rate that is actually used when rendering a primitive.

FIG. 1 shows a graphics processing system which may be operated in accordance with an embodiment of the technology described herein. The graphics processing system comprises a host processor (CPU) 1, a graphics processing unit (GPU) 3, and a memory 5 for storing data required by and/or generated by the host processor 1 and graphics processor 3.

When an application 2 that is executing on the host processor 1 requires graphics processing from the graphics processor 3, such as a frame to be displayed, the application 2 sends appropriate commands and data to a driver 4 for the graphics processor 3 that is running on the host processor 1.

In the present embodiment, these commands and data include information from which plural input shading rates can be determined. In particular, in the present embodiment the application 2 can specify one or more "per-primitive" shading rates, one or more "per-draw call" shading rates, and one or more "per-screen space" shading rates.

Each "per-primitive" shading rate indicates a shading rate that any primitives (and thus fragments) associated with a particular vertex should be rendered using. A "per-primitive" shading rate for a (each) vertex may be specified in vertex data for that vertex.

Each "per-draw call" shading rate indicates a shading rate that any primitives (and thus fragments) that belong to a particular draw call should be rendered using. A "per-draw call" shading rate for a (each) draw call may be specified in the associated draw call descriptor.

Each "per-screen space" shading rate indicates a shading rate that should be used to render any primitives or fragments that appear within a particular region of a render output. In the present embodiment, a render output is divided into a plurality equally sized rectangular (such as square) regions, and a "per-screen space" shading rate is specified for each such region. An array of "per-screen space" shading rates may thus be specified for a (each) render output, with each element of the array corresponding to one of the regions of the render output.

The application 2 may consequently specify a "per-primitive" input shading rate, a "per-draw call" input shading rate and a "per-screen space" input shading rate that apply to the same primitive or fragment, which input shading rates may be different to each other. There is thus a need to be able to combine different input shading rates that are specified for the same primitive or fragment into a single combined output shading rate that should be used when rendering that primitive or fragment.

To allow for this, the application 2 also specifies how different shading rates should be combined. To do this, in the present embodiment, the application 2 specifies a first combining function to be used when combining a "per-primitive" shading rate and a "per-draw call" shading rate, and a second combining function to be used when combining a "per-screen space" shading rate. An output combined shading rate can then be determined by combining a "per-primitive" shading rate and a "per-draw call" shading rate according to the first combining function to determine an "intermediate" combined shading rate, and then combining the "intermediate" combined shading rate with a "per-screen space" shading rate according to the second combining function.

A combining function may combine different shading rates by, for example, selecting one of the shading rates, such as the finest or coarsest shading rate, or by determining an average shading rate. In the present embodiment, an input and/or an output of a combining function is "sanitized" to the nearest shading rate supported by the graphics processor 3.

In response to these commands and data from the application 2, the driver 4 then sends appropriate commands and data to the graphics processor 3 to cause it to generate the render output required by the application 2. The driver 4 sends commands and data to the graphics processor 3 by writing to the memory 5.

The commands and data provided by the driver 4 will include commands to render primitives for the render output to be generated by the graphics processor 3, together with associated vertex data representing the vertices to be used for the primitives for the render output. They will also include information indicating the shading rate information specified by the application 2.

The commands sent to the graphics processor 3 cause the graphics processor 3 to read the vertex data from the memory 5, and process the read vertex data to generate the render output accordingly. The graphics processor 3 will typically use the vertex data for a primitive to rasterise the primitive to one or more fragments each (potentially) applying to a region (area) of the render output. The fragments may then be rendered.

The completed render output (e.g. frame) may be written in a frame buffer in the memory 5, from where it may be provided for display on a display device, such as a screen or printer.

Figure 3:
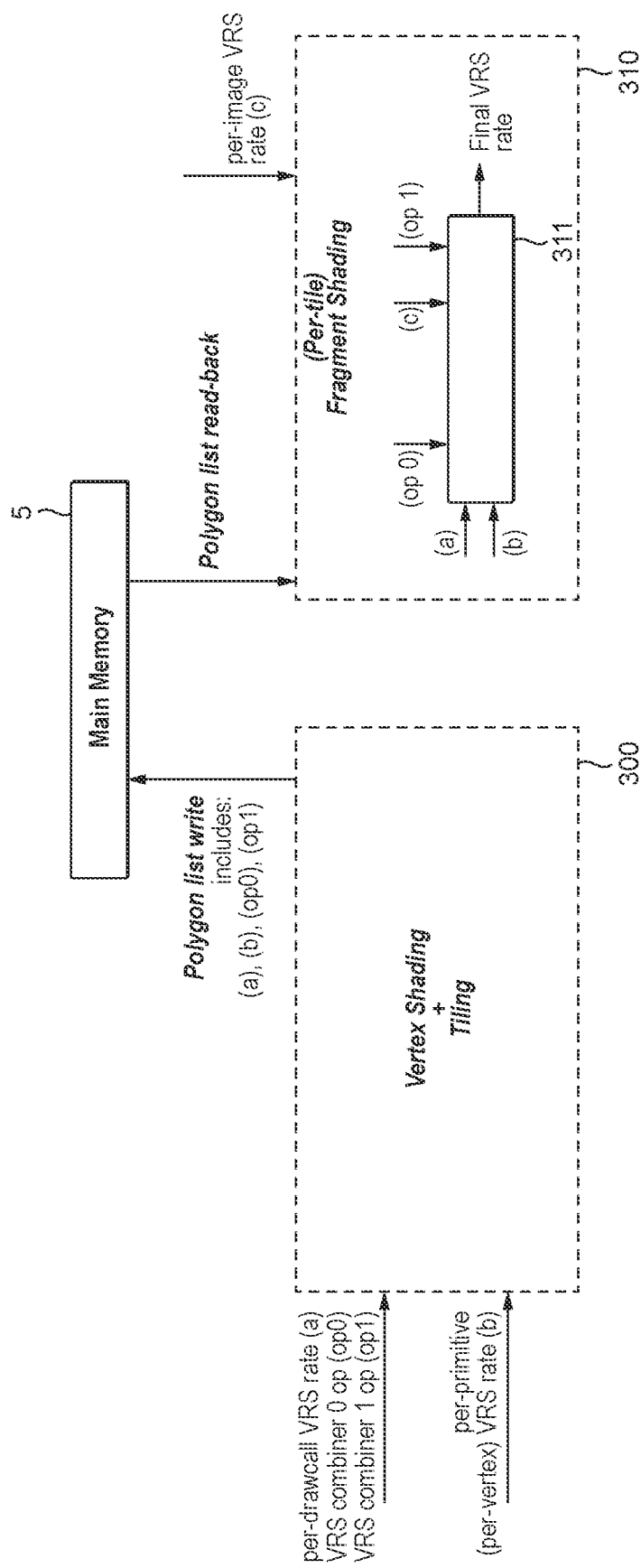
FIG. 3 shows a graphics processing pipeline arrangement that is not in accordance with the technology described herein.

FIG. 3 shows a graphics processing pipeline arrangement in which all input shading rates are combined once all of the input shading rates are available, after the rasterisation stage. It will be appreciated that the arrangement of FIG. 3 is not in accordance with the technology described herein, but is shown for illustrative purposes.

The graphics processing pipeline shown in FIG. 3 is a tile-based graphics processing pipeline and will thus produce tiles of a render output data array, such as an output frame to be generated.

In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

The advantage of such tile-based rendering is that graphics processing commands (primitives) that do not apply to a given tile do not have to be processed for that tile, and therefore can be ignored when the tile is processed. This allows the overall amount of graphics processing necessary for a given render output to be reduced.

In a tile-based rendering system, it is accordingly usually desirable to be able to identify and know those commands (primitives) that actually apply to a given rendering tile so as to, e.g., avoid unnecessarily processing commands and primitives that do not actually apply to a tile.

In order to facilitate this, lists of the primitives to be processed are prepared for different regions of the render output. These "primitive lists" (which can also be referred to as a "tile list" or "polygon list") identify (e.g. by reference to a primitive indicator) the primitives to be processed for the region in question. The regions of the render output that primitive lists can be prepared for can correspond e.g. to single rendering tiles, or to sets of plural rendering tiles. Once the primitive lists have been prepared for the render output regions, each rendering tile can then be processed by rasterising and rendering the primitives listed for the region(s) that encompass the rendering tile.

As shown in FIG. 3, the graphics processing pipeline in this arrangement includes a geometry pipeline 300, and a rendering pipeline 310, both of which can access the memory 5.

The geometry pipeline 300 comprises a vertex shader and a tiling unit. The tiling unit ("tiler") performs the process of "tiling" to allocate primitives to the primitive lists, and uses transformed vertex data provided by the vertex shader. The primitive lists generated by the tiling unit are stored in the memory 5.

As shown in FIG. 3, as part of its processing, the geometry pipeline 300 reads in "per-draw call" (a) and "per-primitive" (b) shading rates, as well as first (op0) and second (op1) combiner functions, and this information is propagated through the pipeline and written with the primitive lists in the memory 5.

The rendering pipeline 310 then reads the appropriate primitive list(s) for a tile from the memory 5 to identify the primitives that are to be rendered for that tile. A rasteriser of the rendering pipeline 310 rasterises those primitives to fragments, and subsequent fragment processing stages of the rendering pipeline 310 render (shade) the fragments to generate rendered data for the rendering tile in question.

As part of its processing, the rendering pipeline 310 reads in "per-draw call" (a), "per-primitive" (b) and "per-screen space" (c) shading rates, as well as first (op0) and second (op1) combiner functions from the memory 5. This information is propagated through the pipeline to a combining stage 311 after the rasteriser, which combining stage 311 uses the information to determine a single output (final) combined shading rate for a fragment generated by the rasteriser. The output (final) combined shading rate is then used by the fragment processing stages of the rendering pipeline 310 when rendering the fragment.

Figure 4:
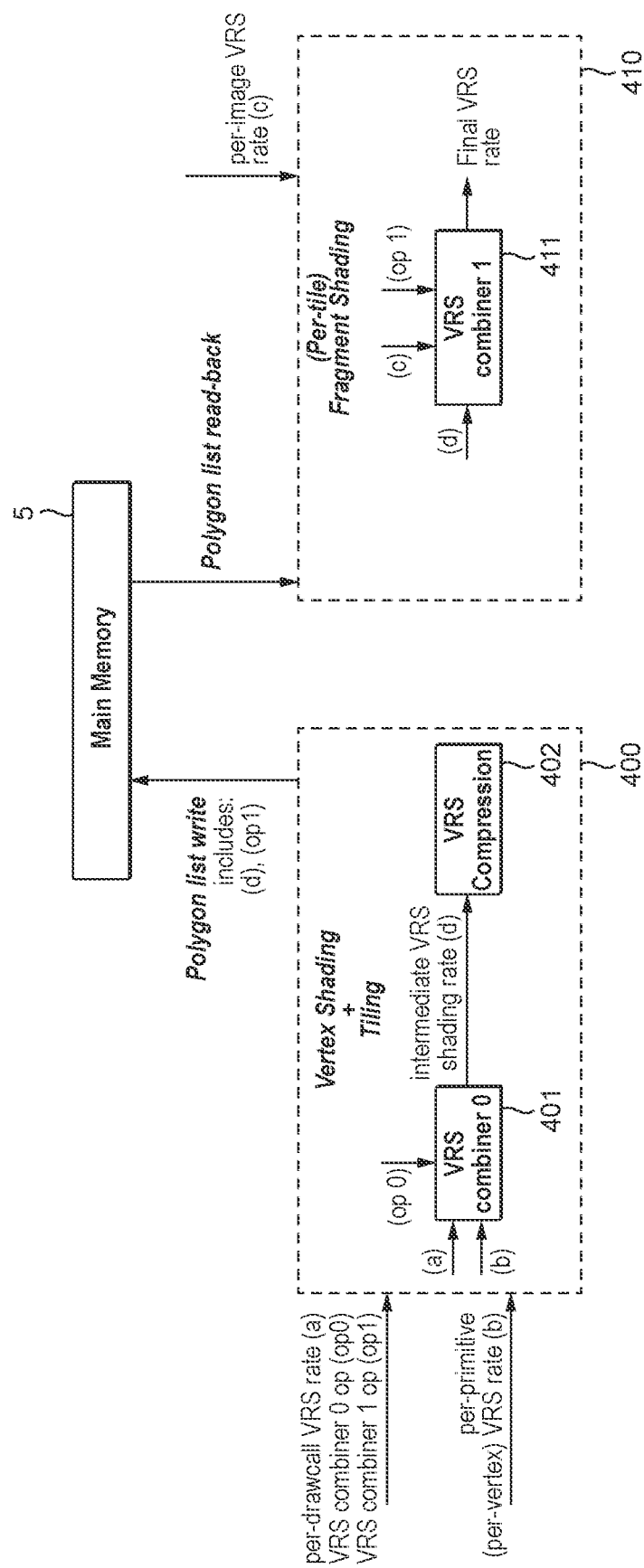
FIG. 4 shows a graphics processing pipeline in accordance with an embodiment of the technology described herein.
Figure 5:
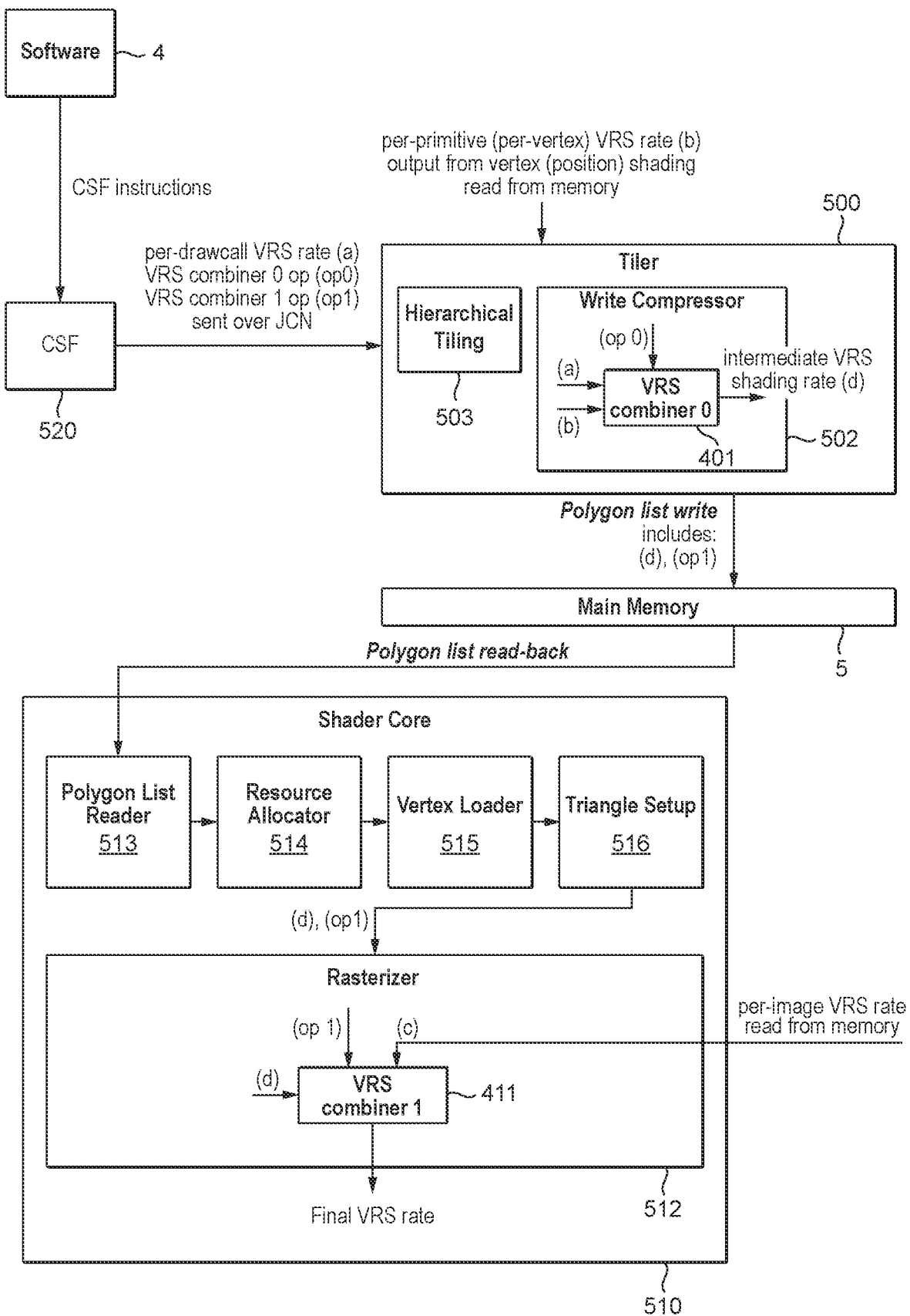
FIG. 5 shows a graphics processing pipeline in accordance with an embodiment of the technology described herein.

FIGS. 4 and 5 show a graphics processing pipeline that may be executed by the graphics processor 3 in accordance with an embodiment of the technology described herein. FIGS. 4 and 5 show the main elements and pipeline stages of the graphics processing pipeline that are relevant to the operation of the present embodiment. As will be appreciated by those skilled in the art there may be other elements of the graphics processing pipeline that are not illustrated in FIGS. 4 and 5. It should also be noted here that FIGS. 4 and 5 are only schematic, and that, for example, in practice the shown functional units and pipeline stages may share significant hardware circuits, even though they are shown schematically as separate stages in FIGS. 4 and 5. It will also be appreciated that each of the stages, elements and units, etc., of the graphics processing pipeline as shown in FIGS. 4 and 5 may be implemented as desired and will accordingly comprise, e.g., appropriate circuit(s) and/or processing logic, etc., for performing the necessary operation and functions.

The graphics processing pipeline shown in FIGS. 4 and 5, like the graphics processing pipeline of FIG. 3, is a tile-based graphics processing pipeline and will thus produce tiles of a render output data array, such as an output frame to be generated.

As shown in FIG. 4, the graphics processing pipeline of the present embodiment includes a geometry pipeline 400, and a rendering pipeline 410, both of which can access the memory 5.

The geometry pipeline 400 comprises a vertex shader and a tiling unit. The vertex shader takes as it input the raw vertex data provided by the driver 4 that is stored in the memory 5, and processes that data to provide transformed vertex data (which it then stores in the memory 5) comprising the vertex data in a form that is ready for 2D placement in the render output (e.g. frame to be displayed).

The tiling unit ("tiler") performs the process of "tiling" to allocate primitives to the primitive lists, which are then used by the rendering pipeline 410 to identify the primitives that should be rendered for each rendering tile that is to be rendered to generate the render output (frame to be rendered for display). To do this, the tiling unit takes as its input the transformed and processed vertex data from the vertex shader (i.e. the positions of the primitives in the frame), builds primitive lists using that data, and stores those primitive lists in the memory 5.

As shown in FIG. 4, in the present embodiment the geometry pipeline 400 includes a first "variable rate shading" (VRS) combiner circuit 401 and a "variable rate shading" (VRS) compressor circuit 402.

The first VRS combiner 401 takes as it input a "per-draw call" shading rate (a) for a primitive and a "per-primitive" shading rate (b) for the primitive, together with a first combining function (op0), and combines the "per-primitive" shading rate and the "per-draw call" shading rate into a single "intermediate" combined shading rate (d) for the primitive according to the first combining function (op0). The output of the first VRS combiner 401 is "sanitized" to a shading rate supported by the graphics processor 3 (i.e. 1×1, 1×2, 2×1, 2×2, 2×4, 4×2 or 4×4, in the present embodiment).

The VRS compressor 402 takes as it input a "sanitised" intermediate combined shading rate (d) determined by the first VRS combiner 401, and compresses that shading rate to a determine compressed representation of the intermediate combined shading rate. In the present embodiment, there are seven supported shading rates (1×1, 1×2, 2×1, 2×2, 2×4, 4×2 and 4×4), which are encoded by the VRS compressor 402 using three bits. Each of the seven possible shading rates is indicated by a respective bit pattern. Similarly, second combing function (op1) information is compressed by encoding each possible combining function as a respective bit pattern of a set of three bits, and a further bit pattern (0x7) is used to encode the case where "variable rate shading" (VRS) is disabled.

The compressed representation of the second combining function (op1) information is written with the primitive list information in the memory 5 for a (each) draw call, and (when "variable rate shading" (VRS) is enabled) a compressed representation of an intermediate combined shading rate (d) for a (each) primitive is also written in the appropriate primitive list(s) in the memory 5.

The rendering pipeline 410 then reads the appropriate primitive list(s) for a tile from the memory 5 to identify the primitives that are to be rendered for that tile. It then rasterises those primitives to fragments, and renders (shades) the fragments to generate rendered data for the rendering tile in question.

As part of this processing, the rendering pipeline 410 determines a "per-screen space" shading rate (c) that applies to a (each) fragment it is to render (shade). This involves using the sample position(s) associated with the fragment to determine which region of the render output the fragment lies within, and thus which "per-screen space" shading rate applies.

As shown in FIG. 4, in the present embodiment the rendering pipeline 410 includes a second "variable rate shading" (VRS) combiner circuit 411. The second VRS combiner 411 takes as it input an intermediate combined shading rate (d) and a second combining function (op1) based on primitive list information stored for a primitive in the memory 5, and a "per-screen space" shading rate (c) determined for a fragment generated by rasterising that primitive.

The second "variable rate shading" (VRS) combiner 411 combines the intermediate combined shading rate and the "per-screen space" shading rate into a single combined shading rate for the fragment according to the second combining function. The output of the second VRS combiner 411 is "sanitized" to a shading rate supported by the graphics processor 3 (i.e. 1×1, 1×2, 2×1, 2×2, 2×4, 4×2 or 4×4, in the present embodiment). This output (final) combined shading rate is then used by the fragment processing stages of the rendering pipeline 410 when rendering that fragment.

Combining at least "per-primitive" and "per-draw call" input shading rates to determine an intermediate combined shading rate at a relatively early stage in the graphics processing pipeline in this manner can reduce bandwidth requirements, hardware requirements (e.g. in terms of sizes of, and number of, registers) and energy consumption associated with propagating shading rates and combining functions through the pipeline.

For example, in the arrangement of FIG. 3, "per-draw call" (a), "per-primitive" (b) and "per-screen space" (c) shading rates, and first (op0) and second (op1) combining functions are all propagated as far as the combining stage 311 after the rasteriser of the rendering pipeline 310. In contrast, in the embodiment shown in FIG. 4, "per-draw call" (a) and "per-primitive" (b) shading rates, and a first combining function (op0), only need to be propagated through the graphics processing pipeline as far as the first VRS combiner circuit 401 of the geometry pipeline 400.

Thus, in the arrangement illustrated in FIG. 3, the geometry pipeline 300 writes, and the rendering pipeline 310 correspondingly reads, a "per-draw call" shading rate (a), a "per-primitive" shading rate (b), a first combining function (op0) and a second combining function (op1) for primitives listed in the primitive lists(s).

In contrast, in the embodiment illustrated in FIG. 4, the geometry pipeline 400 only needs to write, and the rendering pipeline 410 correspondingly only needs to read, information for an intermediate combined shading rate (d), instead of for both "per-draw call" (a) and "per-primitive" (b) shading rates. Furthermore, the geometry pipeline 400 only needs to write, and the rendering pipeline 410 only needs to read, information for a second combining function (op1), but not for the corresponding first combining function (op0).

Thus, it will be appreciated that the embodiment of FIG. 4 will reduce bandwidth, hardware and energy requirements as compared to the arrangement of FIG. 3.

FIG. 5 shows the graphics processing pipeline of the present embodiment in more detail.

As shown in FIG. 5, the driver 4 sends commands and data for a draw call to the graphics processor 3 in the form of Command Stream Frontend (CSF) instructions. The Command Stream Frontend (CSF) 520 of the graphics processor 3 receives these instructions, and sends appropriate commands over a Job Control Network (JCN) of the graphics processor 3 to the tiling unit ("tiler") 500 to cause the tiling unit 500 to perform the "tiling" process. As illustrated in FIG. 5, these commands include information indicative of the "per-draw call" shading rate (a), and first (op0) and second (op1) combining functions.

In the present embodiment, the tiling unit 500 operates to distribute vertex processing tasks to the vertex shader (not shown in FIG. 5) to generate transformed vertex data as and when the tiling unit 500 actually requires transformed vertex data in order to prepare primitive lists. As part of this processing, the tiling unit 500 receives "per-primitive" shading rates (b) for the vertices (primitives) being processed from the vertex data in the memory 5.

In the present embodiment, the tiling unit 500 prepares primitive lists for different sized, "hierarchical" regions of the render output, and includes a hierarchical tiling unit 503 for this purpose. However, other, e.g. non-hierarchical, arrangements would be possible.

As shown in FIG. 5, in the present embodiment, the tiling unit 500 further includes a write compressor 502 that operates to compress primitive list information generated by the hierarchical tiling unit 503, and to write the compressed primitive list information to the memory 5.

In the present embodiment, the first VRS combiner 401 and the VRS compressor 402 are provided as part of the write compressor 502 of the tiling unit 500. In this regard, the Applicants have recognised that a tiling unit 500 of a tile-based graphics processing pipeline may typically be the earliest processing stage of the pipeline where "per-primitive" and "per-draw call" input shading rates for a primitive are available. As such, locating the first VRS combiner 401 in the tiling unit 500 can minimise the propagation of individual "per-primitive" and "per-draw call" shading rates through the pipeline, and thus minimise bandwidth, hardware and energy requirements.

In the present embodiment, the write compressor 502 operates to compare a current intermediate shading rate for a current primitive that is to be written to a primitive list with a previous intermediate shading rate for a previous primitive written to that primitive list, to determine if the current intermediate shading rate is different to the previous intermediate shading rate, and to only write intermediate shading rate information to the primitive list when it is determined that the current intermediate shading rate is different to the previous intermediate shading rate. This can further reduce energy and bandwidth requirements.

Once primitive list information has been written to the memory 5, it is read and processed by the rendering pipeline 410, which in the present embodiment, as shown in FIG. 5, is executed by a shader core (programmable execution unit) 510 of the graphics processor 3. The graphics processor 3 may include one or more (e.g. plural) such shader cores (execution units), each of which may execute the rendering pipeline in parallel.

As shown in FIG. 5, the rendering pipeline includes primitive list reader 513, primitive setup stages including resource allocator 514, vertex loader 515, and triangle set-up unit 516, and rasteriser 512. The rendering pipeline also includes a renderer in the form of one or more fragment processing stages (not shown).

The primitive list reader 513 reads the appropriate primitive list(s) for a tile from the memory 5 to identify the primitives that are to be rendered for the tile. As part of this, the primitive list reader 513 reads in the second combining function (op1) information for a (each) draw call from the memory 5.

When the second combining function (op1) information indicates a particular combining function, then the output of the primitive list reader 513 indicates that that combining function should be used as the second combining function (op1) for primitives in that draw call. In this case, the primitive list reader 513 also reads in, and outputs, the intermediate combined shading rate (d) information for a (each) primitive to be rendered from the memory 5.

When, however, the second combining function (op1) information indicates that "variable rate shading" (VRS) is disabled (when op1=0x7), there will be no intermediate combined shading rate (d) information to be read from the memory 5. In this case, the primitive list reader 513 generates an output indicating that a 1×1 shading rate (i.e. the finest possible shading rate) should be used for all primitives in that draw call.

The resource allocator 514 then configures the various elements of the graphics processor 3 for rendering the primitives that the primitive list reader 513 has identified are to be rendered for the tile. For example, the resource allocator 514 appropriately configures a tile buffer of the graphics processor 3 (not shown) for storing output data for the tile being rendered.

The vertex loader 515 then reads the appropriate processed vertex data for primitives to be rendered from the memory 5, and provides the primitives (i.e. their processed vertex data) to the triangle set-up unit 516.

The triangle set-up unit 516 performs primitive setup operations to setup the primitives to be rendered. This includes determining, from the vertices for the primitives, edge information representing the primitive edges. The edge information for the primitives is then passed to the rasteriser 512.

When the rasteriser 512 receives a graphics primitive for rendering (i.e. including its edge information), it rasterises the primitive to sampling points and generates one or more graphics fragments having appropriate positions (representing appropriate sampling positions) for rendering the primitive.

In the present embodiment, the rasteriser 512 also reads in an array of "per-screen space" shading rates from memory 5, and uses this information to determine a "per-screen space" shading rate (c) for a (each) fragment.

As shown in FIG. 5, in the present embodiment, the second VRS combiner 411 is provided as part of the rasteriser 512. The second VRS combiner 411 combines an intermediate combined shading rate (d) determined from primitive list information read by the primitive list reader 513 with a "per-screen space" shading rate (c) according to a second combining function (op1) determined from primitive list information read by the primitive list reader 513, to determine an output (final) combined shading rate to be used when rendering a fragment.

Fragments generated by the rasteriser 512 pass to the fragment processing stages (not shown) for fragment processing (rendering), and are rendered using an output combined shading rate determined in this manner.

Output data generated for a fragment is then written appropriately to the tile buffer (not shown), and the output shading rate information is used to control this output operation. For example, in the case of a 1×1 shading rate, a single set of output data values will be written to one or more sampling points in the tile buffer corresponding to a (only) single fine pixel. In the case of a coarser shading rate, a single set of output data values will be written to one or more sampling points in the tile buffer corresponding to a block of plural fine pixels. For example, in the case of a 1×2 shading rate, a single set of output data values will be written to one or more sampling points in the tile buffer corresponding to a block of 1×2 fine pixels. Other shading rates will be handled in a corresponding manner.

Once the rendering pipeline has completed the processing of a tile of the render output, the rendered data for the tile is exported to the memory 5 (e.g. to a frame buffer in the main memory 5) for storage. The next tile is then processed by the rendering pipeline 410, and so on, until sufficient tiles have been processed to generate the entire render output (e.g. frame (image) to be displayed). The overall process is then repeated for the next render output (e.g. frame), and so on.

Other arrangements for the graphics processing pipeline would be possible.

For example, although the above has been described with reference to an intermediate combined shading rate being determined by a tiling stage of a tile-based graphics processing pipeline, an intermediate combined shading rate could be determined by another processing stage of the pipeline prior to the rasteriser, such as by a vertex processing stage or a primitive setup stage.

Furthermore, although the above has been described with reference to a tile-based graphics processing pipeline, other forms of graphics processing pipelines, such as immediate mode graphics processing pipelines, would be possible. In the case of an immediate mode graphics processing pipeline, the generation of an intermediate combined shading rate may be performed, for example, by a vertex processing stage or a primitive setup stage.

Figure 6:
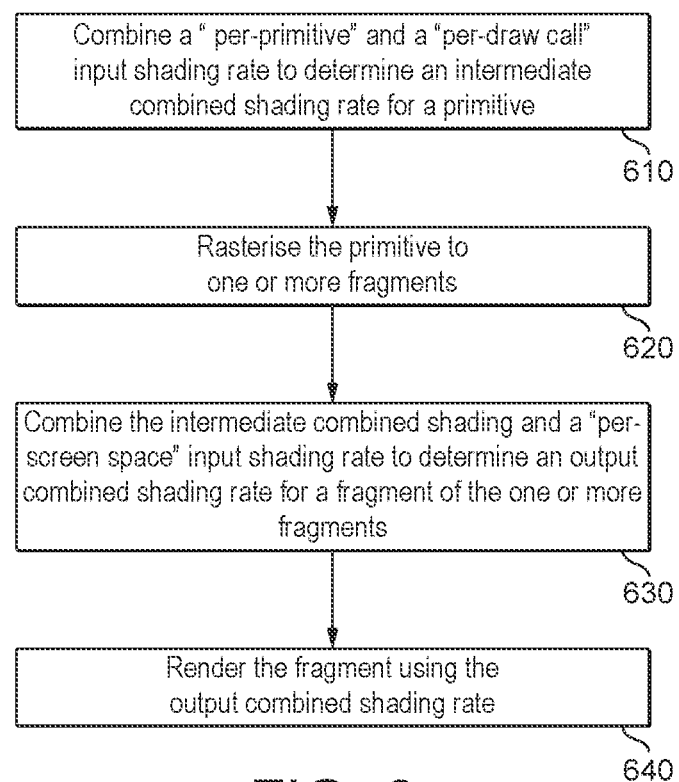
FIG. 6 shows a process in accordance with an embodiment of the technology described herein.

FIG. 6 shows a "variable rate shading" (VRS) rendering process according to an embodiment. As shown in FIG. 6, at step 610 a "per-primitive" input shading rate and a "per-draw call" input shading rate are combined according to a first combining function to determine an intermediate combined shading rate for a primitive. At step 620, the primitive is rasterised by the rasteriser 512 into one or more fragments. At step 630, the intermediate combined shading rate and a "per-screen space" input shading rate for one of the fragments are combined according to a second combining function to determine a final output combined shading rate for the fragment. At step 640, the fragment is rendered (shaded) using the output combined shading rate.

It will be appreciated from the above that the technology described herein, in its embodiments at least, provides arrangements in which the bandwidth and hardware requirements, and energy consumption, of a graphics processor can be reduced. This is achieved, in the embodiments of the technology described herein at least, by combining plural input shading rates to determine (into) a combined shading rate in an embodiment prior to rasterisation (and in an embodiment at the tiling stage), and then propagating the combined shading rate through the pipeline instead of the plural input shading rates.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

What is claimed is:

1. A method of operating a graphics processor that is operable to execute a graphics processing pipeline that can generate a render output using different shading rates, wherein the graphics processing pipeline comprises one or more earlier processing stages followed by later processing stages, wherein the later processing stages comprise at least a rasteriser, and a renderer that is operable to render a render output using one or more output shading rates, wherein an output shading rate used by the renderer to render a render output may be determined using plural input shading rates defined for the render output;

the method comprising, when generating a render output for which a plurality of input shading rates have been defined:

combining at least a first input shading rate defined for the render output and a second input shading rate defined for the render output to determine a combined shading rate for the render output prior to the rasteriser stage of the graphics processing pipeline, and providing the determined combined shading rate to one or more of the later processing stages of the graphics processing pipeline;

using the determined combined shading rate when determining an output shading rate to be used by the renderer to render the render output; and the renderer rendering at least some of the render output using the determined output shading rate.

2. The method of claim 1, wherein the first input shading rate is a shading rate associated with a primitive that the renderer is to render when rendering the at least some of the render output, and the second input shading rate is a shading rate associated with a draw call that the renderer is to render when rendering the at least some of the render output.

3. The method of claim 1, wherein using the determined combined shading rate when determining an output shading rate to be used by the renderer to render the render output comprises combining at least the determined combined shading rate and a third input shading rate defined for the render output to determine the output shading rate at or after the rasteriser stage of the graphics processing pipeline.

4. The method of claim 3, comprising providing to one or more of the later processing stages, information indicating how the determined combined shading rate and the third input shading rate should be combined, and omitting providing to the one or more of the later processing stages, information indicating how the first input shading rate and the second input shading rate should be combined.

5. The method of claim 3, wherein the third input shading rate is a shading rate associated with a region of the render output that the renderer is to render when rendering the at least some of the render output.

6. The method of claim 1, wherein the graphics processor is a tile-based graphics processor, and the one or more earlier processing stages comprise a primitive list preparing stage; the method comprising:
the primitive list preparing stage combining the at least the first input shading rate and the second input shading rate defined for the render output to determine the combined shading rate for the render output, and providing the determined combined shading rate to the one or more of the later processing stages of the graphics processing pipeline.

7. The method of claim 6, wherein the primitive list preparing stage providing the determined combined shading rate to the one or more of the later processing stages comprises the primitive list preparing stage writing information indicating the determined combined shading rate to one or more primitive lists.

8. The method of claim 7, wherein the primitive list preparing stage writing information indicating the determined combined shading rate to one or more primitive lists comprises the primitive list preparing stage only writing information indicating the determined combined shading rate to the one or more primitive lists when there is a change of shading rate.

9. The method of claim 1, comprising determining a compressed representation of the determined combined shading rate prior to the rasteriser stage of the graphics processing pipeline, and providing the compressed representation of the determined combined shading rate to the one or more of the later processing stages.

10. A graphics processor that is operable to execute a graphics processing pipeline that can generate a render output using different shading rates, wherein the graphics processing pipeline comprises one or more earlier processing stages followed by later processing stages, wherein the later processing stages comprise at least a rasteriser, and a renderer that is operable to render a render output using one or more output shading rates, wherein an output shading rate used by the renderer to render a render output may be determined using plural input shading rates defined for the render output;
wherein the graphics processor comprises a combining circuit prior to the rasteriser stage of the graphics processing pipeline that is configured to combine at least a first input shading rate defined for a render output and a second input shading rate defined for the render output to determine a combined shading rate for the render output, and to cause the determined combined shading rate to be provided to one or more of the later processing stages of the graphics processing pipeline; and
wherein the renderer is operable to render at least some of a render output using an output shading rate determined using a combined shading rate determined by the combining circuit.

11. The graphics processor of claim 10, wherein the first input shading rate is a shading rate associated with a primitive that the renderer is to render when rendering at least some of a render output, and the second input shading rate is a shading rate associated with a draw call that the renderer is to render when rendering at least some of a render output.

12. The graphics processor of claim 10, wherein the graphics processor comprises a second combining circuit that is configured to combine at least a combined shading rate determined by the combining circuit for a render output and a third input shading rate define for the render output to determine an output shading rate at or after the rasteriser stage of the graphics processing pipeline; and
wherein the renderer is operable to render at least some of a render output using an output shading rate determined by the second combining circuit.

13. The graphics processor of claim 12, wherein the graphics processing pipeline is operable to provide to one or more of the later processing stages, information indicating how a combined shading rate determined by the combining circuit and a third input shading rate should be combined by the second combining circuit, and to omit providing to the one or more of the later processing stages, information indicating how a first input shading rate and a second input shading rate should be combined by the combining circuit.

14. The graphics processor of claim 12, wherein the third input shading rate is a shading rate associated with a region of a render output that the renderer is to render when rendering at least some of the render output.

15. The graphics processor of claim 10, wherein the graphics processor is a tile-based graphics processor and comprises a primitive list preparing circuit;
wherein the primitive list preparing circuit comprises the combining circuit.

16. The graphics processor of claim 15, wherein the primitive list preparing circuit is configured to provide a combined shading rate determined by the combining circuit to the one or more of the later processing stages by writing information indicating the determined combined shading rate to one or more primitive lists.

17. The graphics processor of claim 16, wherein the primitive list preparing circuit is configured to write information indicating the determined combined shading rate to one or more primitive lists by only writing information indicating the determined combined shading rate to the one or more primitive lists when there is a change of shading rate.

18. The graphics processor of claim 10, comprising a shading rate compressor circuit configured to determine a compressed representation of a combined shading rate determined by the combining circuit prior to the rasteriser stage of the graphics processing pipeline, and to provide the compressed representation of the determined combined shading rate to the one or more of the later processing stages.

19. A non-transitory computer readable storage medium storing software code which when executing on a processor performs a method of operating a graphics processor that is operable to execute a graphics processing pipeline that can generate a render output using different shading rates, wherein the graphics processing pipeline comprises one or more earlier processing stages followed by later processing stages, wherein the later processing stages comprise at least a rasteriser, and a renderer that is operable to render a render output using one or more output shading rates, wherein an output shading rate used by the renderer to render a render output may be determined using plural input shading rates defined for the render output;
the method comprising, when generating a render output for which a plurality of input shading rates have been defined:

combining at least a first input shading rate defined for the render output and a second input shading rate defined for the render output to determine a combined shading rate for the render output prior to the rasteriser stage of the graphics processing pipeline, and providing the determined combined shading rate to one or more of the later processing stages of the graphics processing pipeline;

using the determined combined shading rate when determining an output shading rate to be used by the renderer to render the render output; and the renderer rendering at least some of the render output using the determined output shading rate.

\* \* \* \* \*